United States Patent
Chen et al.

(10) Patent No.: US 11,696,153 B2
(45) Date of Patent: Jul. 4, 2023

(54) TRANSFER LEARNING OF NETWORK TRAFFIC PREDICTION MODEL AMONG CELLULAR BASE STATIONS

(71) Applicant: SAMSUNG ELECTRONICS CO., LTD., Suwon-si (KR)

(72) Inventors: Xi Chen, Montreal (CA); Ju Wang, Montreal (CA); Hang Li, Montreal (CA); Yi Tian Xu, Montreal (CA); Di Wu, Montreal (CA); Xue Liu, Montreal (CA); Gregory Lewis Dudek, Westmount (CA); Taeseop Lee, Seoul (KR); Intaik Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 52 days.

(21) Appl. No.: 17/391,708

(22) Filed: Aug. 2, 2021

(65) Prior Publication Data
US 2022/0053341 A1    Feb. 17, 2022

Related U.S. Application Data

(60) Provisional application No. 63/065,090, filed on Aug. 13, 2020.

(51) Int. Cl.
*H04W 16/18* (2009.01)
*H04W 16/22* (2009.01)

(52) U.S. Cl.
CPC ........... *H04W 16/22* (2013.01); *H04W 16/18* (2013.01)

(58) Field of Classification Search
CPC .............................. H04W 16/22; H04W 16/28
See application file for complete search history.

(56) References Cited

U.S. PATENT DOCUMENTS

| | | | |
|---|---|---|---|
| 7,142,868 B1 | 11/2006 | Broyles et al. | |
| 2010/0216477 A1 | 8/2010 | Ryan | |
| 2012/0284080 A1* | 11/2012 | De Oliveira | G06Q 30/0201 705/7.29 |
| 2017/0230267 A1 | 8/2017 | Armolavicius et al. | |
| 2017/0295501 A1 | 10/2017 | Wang et al. | |
| 2018/0130019 A1* | 5/2018 | Kolb | G06F 16/24578 |
| 2018/0137412 A1 | 5/2018 | Nikkhah et al. | |
| 2019/0099653 A1* | 4/2019 | Wanke | G07C 1/22 |
| 2020/0118007 A1 | 4/2020 | Hong et al. | |
| 2021/0368393 A1* | 11/2021 | Kotecha | H04B 17/3913 |

OTHER PUBLICATIONS

Kang, Jikun et al., "Hierarchical Policy Learning for Hybrid Communication Load Balancing", ICC, IEEE, 2021. (6 pages total).
Sciancalepore, Vincenzo et al., "Mobile Traffic Forecasting for Maximizing 5G Network Slicing Resource Utilization", IEEE INFOCOM 2017. (9 pages total).

(Continued)

*Primary Examiner* — Michael T Vu
(74) *Attorney, Agent, or Firm* — Sughrue Mion, PLLC

(57) ABSTRACT

Transfer learning based on prediction determines a similarity between a source base station and a target base station. Importance of parameters is determined and training is adjusted to respect the importance of parameters. A lack of historical data is compensated by selecting a base station as source base station which has a larger amount of historical data.

20 Claims, 13 Drawing Sheets

(56) References Cited

OTHER PUBLICATIONS

Huang, Yupin et al., "Short-Term Traffic Prediction by Two-Level Data Driven Model in 5G-Enabled Edge Computing Networks", IEEE Access, vol. 7, 2019, pp. 123981-123991. (11 pages total).
Zhang, Ning et al., "Synergy of Big Data and 5G Wireless Networks: Opportunities, Approaches, and Challenges", IEEE Wireless Communications, Feb. 2018, pp. 12-18. (7 pages total).
Zhang, Chuanting et al., "Citywide Cellular Traffic Prediction Based on Densely Connected Convolutional Neural Networks", IEEE Communications Letters, vol. 22, No. 8, Aug. 2018, pp. 1656-1659. (4 pages total).
Wang, Xu et al., "Spatio-temporal analysis and prediction of cellular traffic in metropolis", 2017, Proceedings of the 25th IEEE International Conference on Network Protocols. (15 pages total).
Grijpink, Ferry et al., "The road to 5G: The inevitable growth of infrastructure cost", McKinsey & Company Technology, Media & Telecommunications, Article, 2018 https://tinyurl.com/zhcsw5h4. (16 pages total).
Chen, Xubin et al., "Reducing Flash Memory Write Traffic by Exploiting a Few MBs of Capacitor-Powered Write Buffer Inside Solid-State Drives (SSDs)", IEEE Transactions on Computers, vol. 68, No. 3, Mar. 2019, pp. 426-439. (14 pages total).
Huawei, "Cloud data centers in the 5G era", White Paper, 2020,https://tinyurl.com/y5br4uf8. (10 pages total).
5G Americas, "5G at the Edge", Whitepaper, Oct. 2019, https://tinyurl.com/y6fspycd. (59 pages tptal).
Zhang, Chuanting et al., "Deep Transfer Learning for Intelligent Cellular Traffic Predictions Based on Cross-Domain Big Data", IEEE Journal on Selected Ares in Communications, vol. 37, No. 6, Jun. 2019, pp. 1389-1401. (13 pages total).
Yang, Qiang et al., "Federated Machine Learning: Concept and Applications", ACM Trans. Intell. Syst. Technol., vol. 10, No. 2, Article 12, Jan. 2019. (19 pages total).
Bishop, Christopher M., "Pattern recognition and machine learning", Springer, 2007. (12 pages total).
Kirkpatrick, James et al., "Overcoming catastrophic forgetting in neural networks", PNAS, Mar. 28, 2017, vol. 114, No. 13, pp. 3521-3526. (6 pages total).
Pascanu, Razvan et al., "Revisiting natural gradient for deep networks", arXiv:1301.3584v7 [cs.LG], Feb. 17, 2014. (18 pages total).
Tajbakhsh, Nima et al., "Convolutional Neural Networks for Medical Image Analysis: Full Training or Fine Tuning?", IEEE Transactions on Medical Imaging, vol. 35, No. 5, May 2016, pp. 1299-1312. (14 pages total).
Zhang, Chaoyun et al., "Long-Term Mobile Traffic Forecasting Using Deep Spatio-Temporal Neural Networks", arXiv:1712.08083v1 [cs.NI], Dec. 21, 2017. (10 pages total).
Azizpour, Hossein et al., "Factors of Transferability for a Generic ConvNet Representation" IEEE Transaction on Pattern Analysis and Machine Intelligence, vol. 38, No. 9, Sep. 2016, pp. 1790-1802. (13 pages total).
Ashtiani, Farid et al., "Mobility Modeling and Analytical Solution for Spatial Traffic Distribution in Wireless Multimedia Networks", IEEE Journal on Selected Areas in Communications, vol. 21, No. 10, Dec. 2003, pp. 1699-1709. (11 pages total).
Tutschku, Kurt et al., "Spatial Traffic Estimation and Characterization for Mobile Communication Network Design", IEEE Journal on Selected Areas in Communications, vol. 16, No. 5, Jun. 1998, pp. 804-811. (8 pages total).
Li, Rongpeng et al., "The Learning and Prediction of Application-Level Traffic Data in Cellular Networks", IEEE Transactions on Wireless Communications, vol. 16, No. 6, Jun. 2017, pp. 3899-3912. (14 pages total).
Moayedi, H. Zare et al., "Arima Model for Network Traffic Prediction and Anomaly Detection", 2008 IEEE ITCC. (6 pages total).
Chinchali, Sandeep et al., "Cellular Network Traffic Scheduling with Deep Reinforcement Learning", The Thirty-second AAAI Conference on Artificial Intelligence (AAAI-18), 2018, pp. 766-774. (9 pages total).
Chaudhuri, Arindam, "Hierarchical Support Vector Regression for QoS Prediction of Network Traffic Data", IML '17, Oct. 17-18, 2017, Liverpoole, UK. (6 pages total).
Chen, Xiaming et al., "Analyzing and Modeling Spatio-Temporal Dependence of Cellular Traffic at City Scale", IEEE ICC 2015—Mobile and Wireless Networking Symposium, pp. 3585-3591. (7 pages total).
Wang, Jing et al., "Spatiotemporal Modeling and Prediction in Cellular Networks: A Big Data Enabled Deep Learning Approach", IEEE INFOCOM 2017—IEEE Conference on Computer Communications. (7 pages total).
Chen, Xi et al., "One for All: Traffic Prediction at Heterogeneous 5G Edge with Data-Efficient Transfer Learning", GLOBECOM 2021-2021 IEEE Global Communications Conference. (6 pages total).
International Search Report and Written Opinion dated Nov. 12, 2021 by the International Searching Authority in counterpart International Application No. PCT/KR2021/010790. (PCT/ISA/220, PCT/ISA/210 and PCT/ISA/237).

* cited by examiner

TRANSFER LEARNING OF NETWORK TRAFFIC PREDICTION MODEL AMONG CELLULAR BASE STATIONS

CROSS REFERENCE TO RELATED APPLICATION

This application claims benefit of priority of U.S. Provisional Application No. 63/065,090 filed Aug. 13, 2020, the contents of which are hereby incorporated by reference.

FIELD

The present disclosure is related to prediction of future communications traffic so that a base station can be configured appropriately.

BACKGROUND

The present application relates to support of cellular communications edge operations, traffic volume (or traffic for short), being one of the most fundamental measures of cellular communications networks, is a key reference variable. An example of cellular communications is 5G. The future/predicted traffic have been used to guide 5G operations, such as predictive resource allocation, dynamic spectrum management, and automated network slicing.

SUMMARY

A problem occurs in radio communication system when a base station (BS) has a poor configuration with respect to present traffic demand. The base station may not be able to provide spectral bandwidth requested from user equipment devices (UEs). Or, a base station may be inefficiently allocated more spectrum than necessary to meet demand. Prediction may be used to determine spectrum to be allocated to a base station before the demand occurs. In order to reduce prediction errors, statistical models in the time domain and spatial models can use the correlation between different Base Stations (BSs) for better prediction. However, sharing history data from one base station to another requires inter-BS bandwidth and memory at the destination BS. Also, the history data may not be relevant for the destination BS. For example, training the destination BS based on historical data may lead to learning prediction patterns which are not useful (overtraining on the history data). Important parameters in a source model may be substantially changed by training with a small amount of data of the destination base station.

At least one embodiment may address these problems by determining a source base station and a similarity with one or more target base stations. Also, the importance of parameters is determined and training is adjusted to respect the importance of parameters. A lack of historical data is compensated by selecting a base station as source base station which has a larger amount of historical data.

Provided herein is server configured to manage traffic prediction model transfer learning among cellular communications base stations (including as a non-limiting example, 5G base stations), the server including: one or more processors; and one or more memories, the one or more memories storing a program, wherein execution of the program by the one or more processors is configured to cause the server to at least: receive a first plurality of base station statistics, wherein the first plurality of base station statistics includes a first data set of a first size from a first base station; receive a second plurality of base station statistics, wherein the second plurality of base station statistics includes a second data set of a second size corresponding to a second base station; select the first base station as a source base station; train a similarity network; receive a source prediction model from the first base station and a first importance score matrix; receive a prediction model request from a target base station, wherein the target base station is the second base station; compute a first similarity using the similarity network; obtain a first scaled importance score matrix based on an importance score matrix and based on the first similarity; and send the source prediction model and the first scaled importance score matrix to the second base station. Thus, the second base station is configured to use the source prediction model, and the first scaled importance score matrix to generate a target prediction model and predict radio system parameters relevant to the second base station. The radio system parameters include a future value of user data traffic passing through the second base station.

In some embodiments, execution of the program by the one or more processors is further configured to cause the server to: receive a third data set of a third size from a third base station; determine a second similarity using the similarity network and the third data set; compute a second scaled importance score matrix based on the second similarity and the importance score matrix; and send the source prediction model and the second scaled importance score matrix to the third base station.

In some embodiments, the first data set includes a histogram of a traffic history of the source base station, wherein an abscissa of the histogram is proportional to bits per second, the first data set further includes a first indication of frequency bands supported by the source base station, a second indication of radio access types supported by the source base station, a third indication of 5G class types supported by the source base station and a fourth indication of user density currently supported by the source base station, and wherein a first node vector is formed based on the first data set.

In some embodiments, the execution of the program by the one or more processors is further configured to cause the server to select a candidate base station with a largest data set as the source base station.

In some embodiments, the similarity network includes an autoencoder, and execution of the program by the one or more processors is further configured to cause the server to train the similarity network by using gradient descent to update parameters of the autoencoder based on an autoencoder loss, wherein the autoencoder loss is a distance between the first node vector and an estimated node vector, wherein the estimated node vector is an output of the similarity network.

In some embodiments, the execution of the program by the one or more processors is further configured to cause the server to compute the first similarity by: obtaining a second node vector from the target base station; obtaining a first latent vector as a first output of the autoencoder when the first node vector is input to the autoencoder; obtaining a second latent vector as a second output of the autoencoder when the second node vector is input to the autoencoder; and computing the first similarity as a cosine similarity between the first latent vector and the second latent vector.

In some embodiments, the importance score matrix is a second order derivative of a Fisher information matrix with respect to weights of the source prediction model, and the first scaled importance score matrix is a product of the importance score matrix and the first similarity.

Also provided herein is a method for managing traffic prediction model transfer learning among 5G base stations, the method including: receiving a first plurality of base station statistics, wherein the first plurality of base station statistics includes a first data set of a first size from a first base station; receiving a second plurality of base station statistics, wherein the second plurality of base station statistics includes a second data set of a second size corresponding to a second base station; selecting the first base station as a source base station; training a similarity network; receiving a source prediction model from the first base station and a first importance score matrix; receiving a prediction model request from a target base station, wherein the target base station is the second base station; computing a first similarity using the similarity network; obtaining a first scaled importance score matrix based on an importance score matrix and based on the first similarity; and sending the source prediction model and the first scaled importance score matrix to the second base station.

Also provided herein is a non-transitory computer readable medium configured to store a program, wherein execution of the program by one or more processors of a server is configured to cause the server to at least: receive a first plurality of base station statistics, wherein the first plurality of base station statistics includes a first data set of a first size from a first base station; receive a second plurality of base station statistics, wherein the second plurality of base station statistics includes a second data set of a second size corresponding to a second base station; select the first base station as a source base station; train a similarity network; receive a source prediction model from the first base station and a first importance score matrix; receive a prediction model request from a target base station, wherein the target base station is the second base station; compute a first similarity using the similarity network; obtain a first scaled importance score matrix based on an importance score matrix and based on the first similarity; and send the source prediction model and the first scaled importance score matrix to the second base station, whereby the second base station is configured to use the source prediction model, and the first scaled importance score matrix to generate a target prediction model and predict radio system parameters relevant to the second base station, wherein the radio system parameters include a future value of user data traffic passing through the second base station.

BRIEF DESCRIPTION OF THE DRAWINGS

The text and figures are provided solely as examples to aid the reader in understanding the invention. They are not intended and are not to be construed as limiting the scope of this invention in any manner. Although certain embodiments and examples have been provided, it will be apparent to those skilled in the art based on the disclosures herein that changes in the embodiments and examples shown may be made without departing from the scope of embodiments provided herein.

DETAILED DESCRIPTION

Embodiments provide TLP, a Transfer Learning based Prediction framework. Embodiments achieve high accuracy on the traffic prediction task with limited and imbalanced data. Embodiments provide data and bandwidth efficiency. Embodiments use available data from both data-abundant reference nodes (base stations) and datalimited regular nodes (base stations) without migration of traffic history logs.

Embodiments use relatively large amount of data from a reference edge node (also referred to as a source base station) to train a base Neural Network (NN) model (called a source model, or source prediction model), which not only extracts node-specific features but also (to some extent) summarizes general features.

Embodiments fine-tune the weights of source model to serve another node (target base station), using the limited amount of data maintained by the target base station.

A major challenge in transferring prediction models between edge nodes is that it is hard to maintain the general features while updating the node-specific features with a small amount of data at the edge (target base station). Embodiments use Layer Freezing (LF), Elastic Weight Consolidation (EWC) and Similarity-based EWC (SEWC).

Embodiments are more fine-grained and node-customized than previous approaches. Embodiments provide weight-level importance scores to balance between 1) keeping an NN weight learned for generality and 2) updating this weight to serve the specific target. Embodiments also customizes the model transfer for each individual edge node by adjusting the importance scores according to the similarity between the source and the target.

Figure 1A:
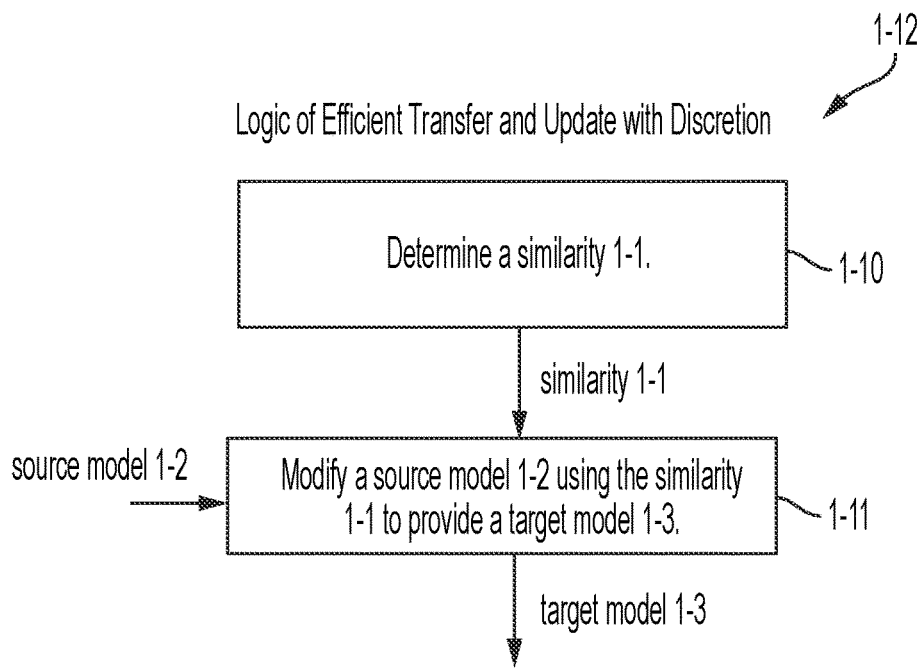
FIG. 1A illustrates a logic flow for determining a target model 1-3 based on a similarity 1-1, according to some embodiments.

FIG. 1A illustrates exemplary logic 1-12 for determining a target model 1-3. At operation 1-10, a similarity 1-1 is determined. At operation 1-11, a source model 1-2 is modified using the similarity 1-1 to provide the target model 1-3.

Figure 1B:
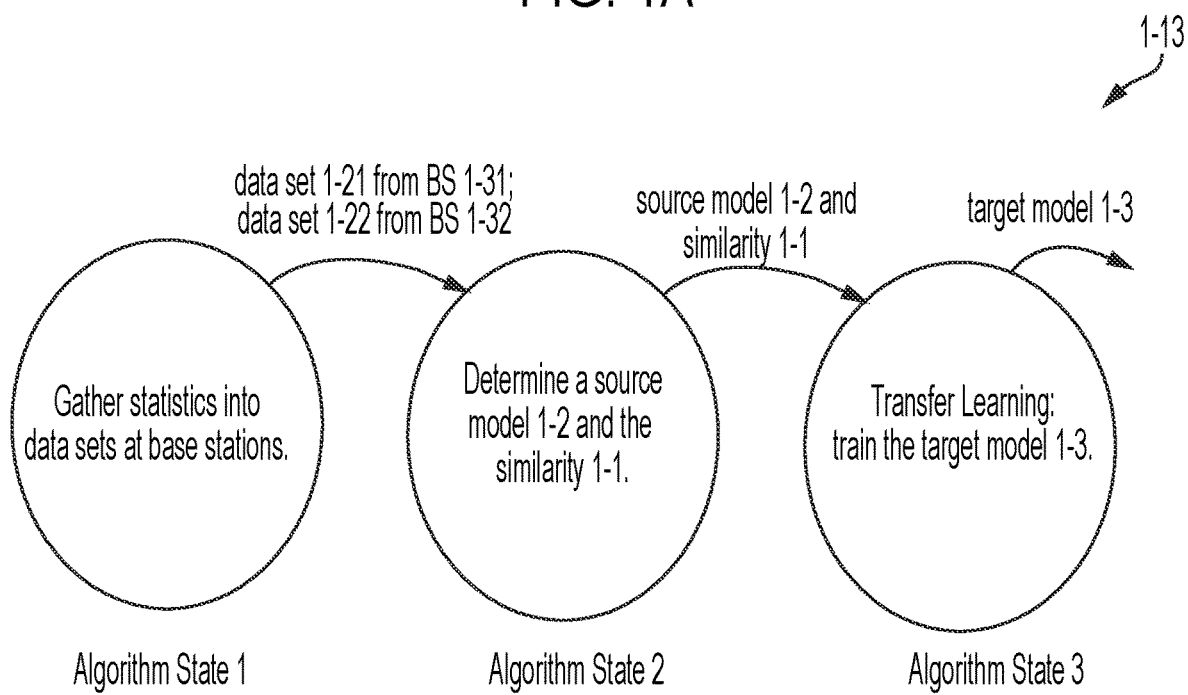
FIG. 1B illustrates an algorithm flow for gathering statistics, determining a source model 1-2 and determining the target model 1-3, according to some embodiments.

FIG. 1B illustrates an exemplary algorithm flow 1-3. At algorithm state 1, statistics are gathered into data sets at base stations. These statistics, for example data set 1-21 from a base station (BS) 1-31 and a data set 1-22 from a BS 1-32 are input to algorithm state 2. At algorithm state 2, a source model 1-2 is determined and the similarity 1-1 (for example, between BS 1-31 and BS 1-32) is determined. At algorithm state 3, transfer learning is performed by training the target model 1-3.

Figure 1C:
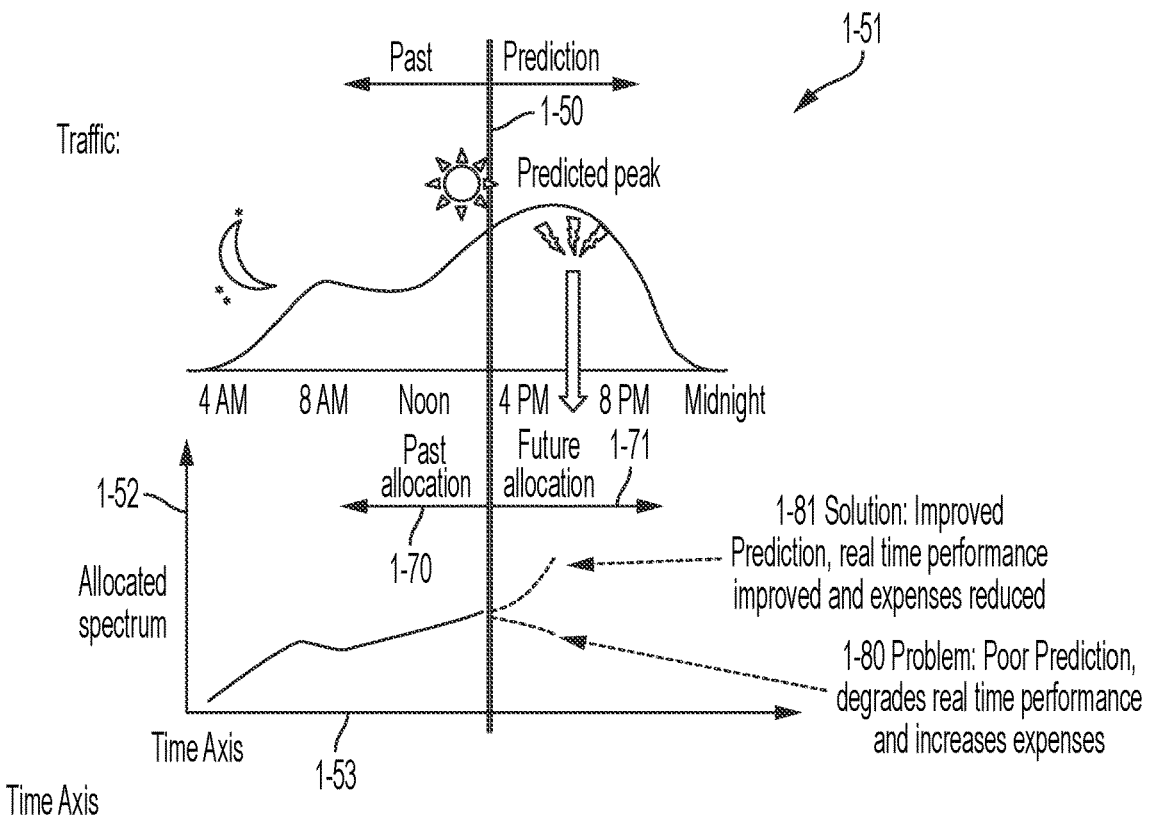
FIG. 1C illustrates a problem 1-80 of poor prediction of traffic and a solution 1-81 of improved prediction, according to some embodiments.

FIG. 1C illustrates a problem 1-80 with traffic prediction and a solution 1-81 of embodiments.

At the top of FIG. 1C, a curve 1-51 showing how traffic builds up from early in the morning (4 AM) reaches a peak (about 6 PM) and trails off (Midnight).

At the bottom of FIG. 1C, allocated spectrum is shown with a vertical axis 1-52 and a horizontal time axis 1-53. A past allocation is indicated with 1-70, and a future allocation is indicated with 1-71. A vertical line 1-50 indicates a time at which prediction is performed. A problem 1-80 occurs if the future allocation indicates a decreasing trend in traffic. Embodiments provide, as a non-limiting example, solution 1-81 in which the prediction more closely follows the future trend. FIG. 1C is schematic in order to illustrate the problem and solution for an example of a communication system 2-50 (FIG. 2) using spectrum. Embodiments are not limited to radio systems.

Figure 1D:
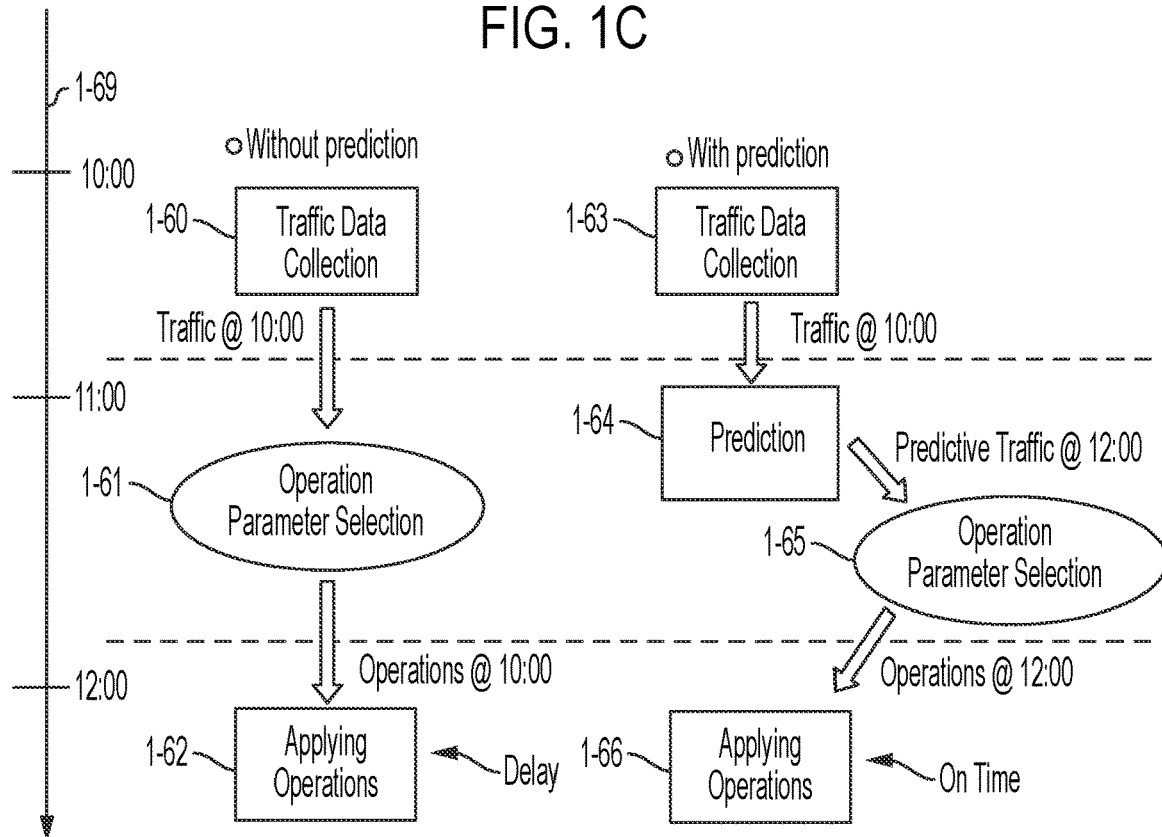
FIG. 1D contrasts delayed operation parameter selection 1-61 with on-time parameter selection 1-65, according to some embodiments.

FIG. 1D further illustrates the problem 1-80 shown in FIG. 1C and the solution 1-81 of FIG. 1C. Time advances from top to bottom as shown by the time axis 1-63. On the left, events 1-60, 1-61, and 1-62 shown at times 10, 11 and 12 are shown without prediction and lead to delayed operations (for example, insufficient spectrum allocated to meet demand, lead to some UEs waiting for service). On the right are events 1-63, 1-64 and 1-65, and 1-66 at 10, 11 and 12 with prediction. An output of operation 1-64 is predicted traffic at the future time of 12. Resources have been duly allocated and at 1-66 resources are sufficient to meet demand, and a number of UEs waiting for service is decreased.

Figure 2:
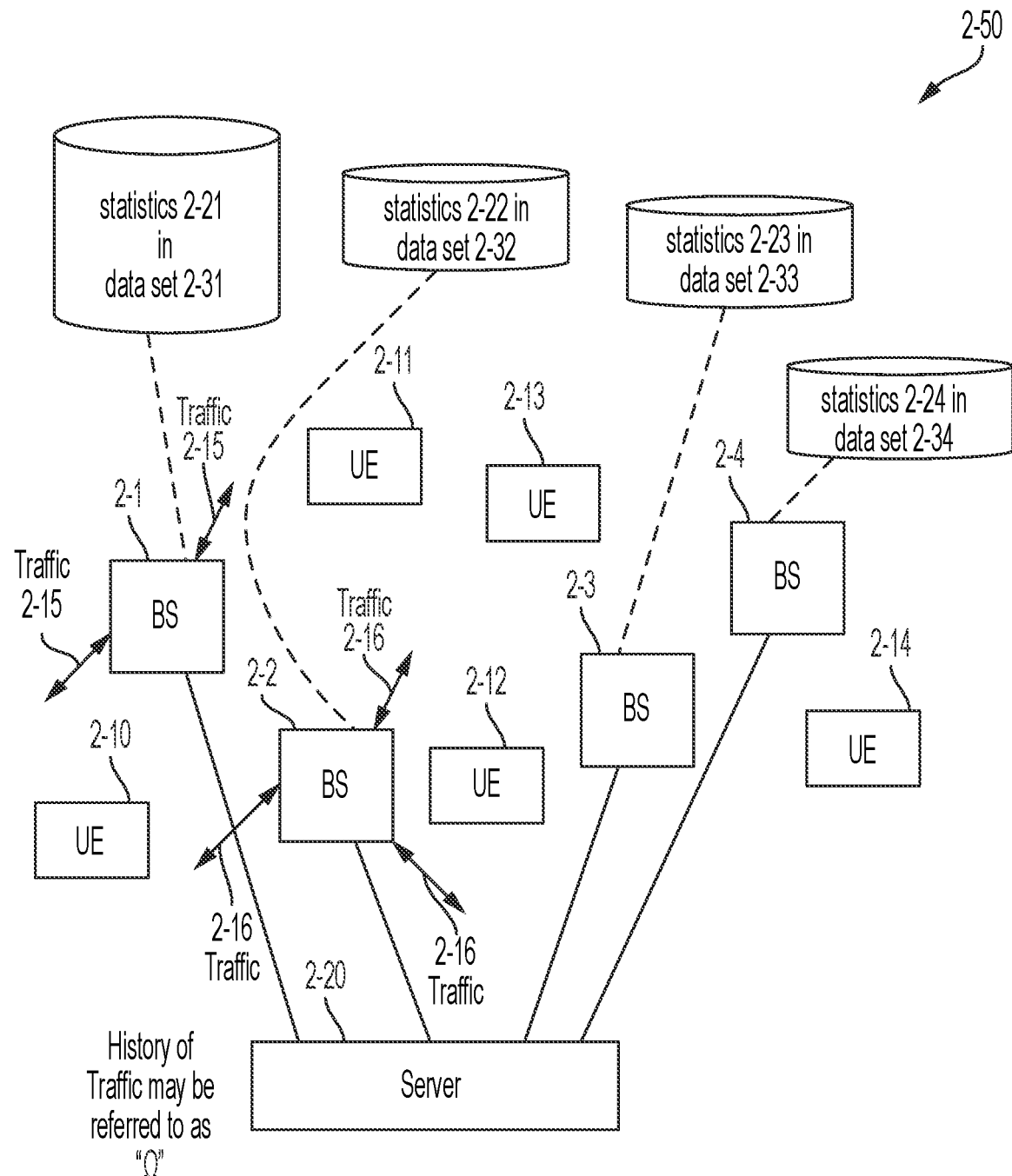
FIG. 2 illustrates a system 2-50 including a server 2-20 and base stations with storage of statistics and UEs generating traffic, according to some embodiments.

FIG. 2 illustrates an exemplary system 2-50. The number of entities is symbolic and not to scale in terms of the numbers in a working system. BS 2-1 stores statistics 2-21 in a data set 2-31. A dashed line is shown to associate BS 2-1 with this storage. In general, the storage of a BS is geographically local to the BS (not geographically remote). Also statistics 2-22 in data set 2-32 are stored by BS 2-2. Similarly statistics 2-3 in data set 2-33 at BS 2-3 and statistics 2-24 in data set 2-34 with BS 2-4. FIG. 2 also illustrates UEs 2-10, 2-11, 2-12, 2-13 and 2-14. The base stations and UEs of FIG. 2 are exemplary of the base stations and UEs of FIG. 1B.

BS 2-1 experiences traffic 2-15 and BS 2-2 experiences traffic 2-16. A history of traffic may be referred to herein using the symbol Q.

Figure 3:
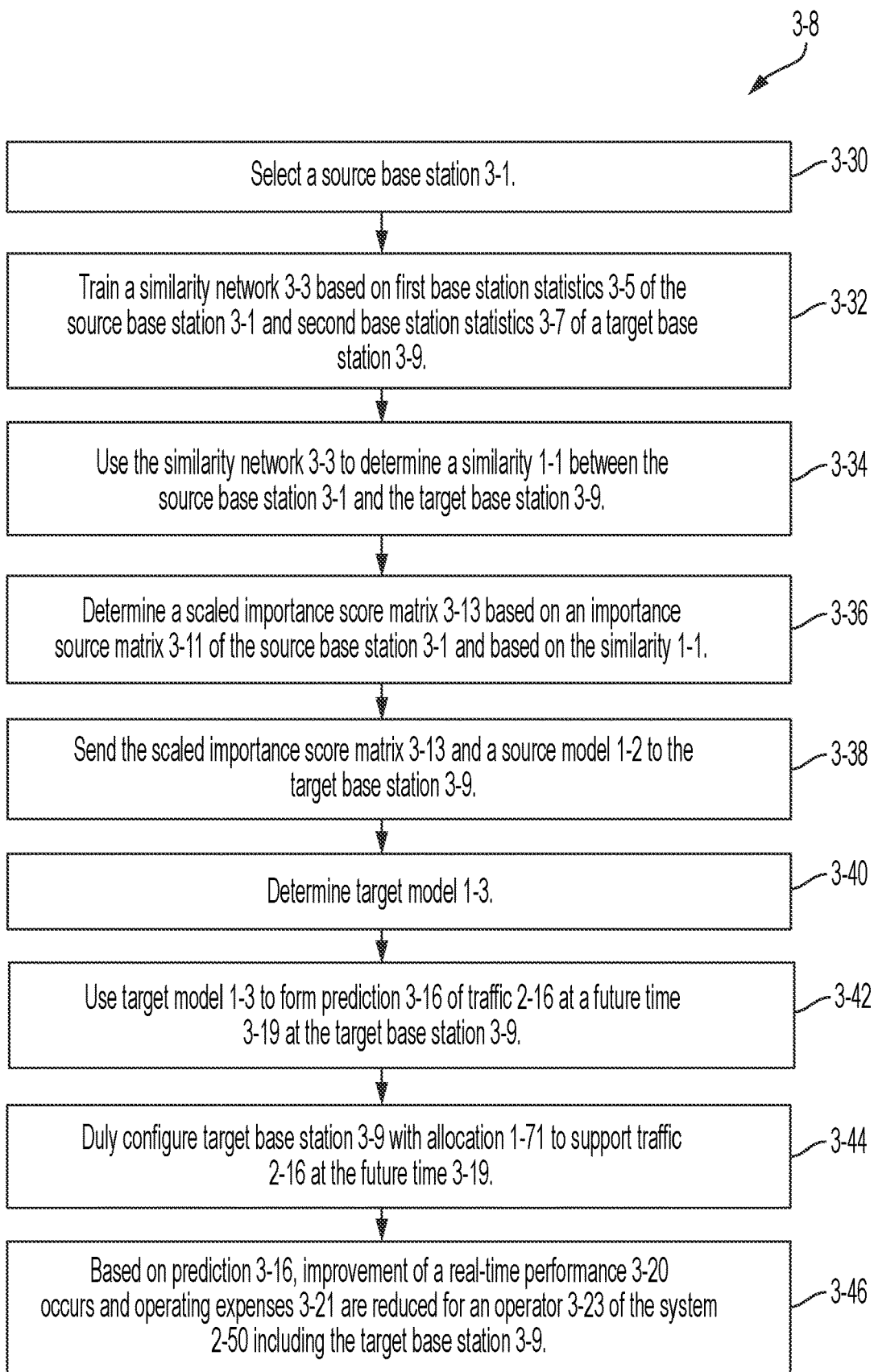
FIG. 3 illustrates an example logic flow for determining a target model 1-3, configuring a target base station 3-9 and improvement of the system 2-50, according to some embodiments.

FIG. 3 illustrates exemplary logic 3-8 for determining a target model 1-3 and improving operation of the system 2-50.

At operation 3-30, a source base station 3-1 is selected. At operation 3-32, a similarity network 3-3 is trained based on first base station statistics 3-5 of the source base station 3-1 and based on second base station statistics 3-7 of a target base station 3-9. At operation 3-34, the similarity network 3-3 is used to determine the similarity 1-1 between the source base station 3-1 and the target base station 3-9. At operation 3-36, a scaled importance score matrix 3-13 is determined based on an importance score matrix 3-11 of the source base station 3-1 and based on the similarity 1-1.

Then, at operation 3-38, the scaled importance score matrix 3-13 and source model 1-2 are sent to the target base station 3-9. The target base station 3-9 determines the target model 1-3 at 3-40. The target base station 3-9 then uses the target model 1-3 to form a prediction 3-16 of local traffic 2-16 at a future time 3-19. The target base station 3-9 is then configured, at the appropriate time, with an allocation 1-71 to support traffic 2-16 at the time 3-19.

Figure 4:
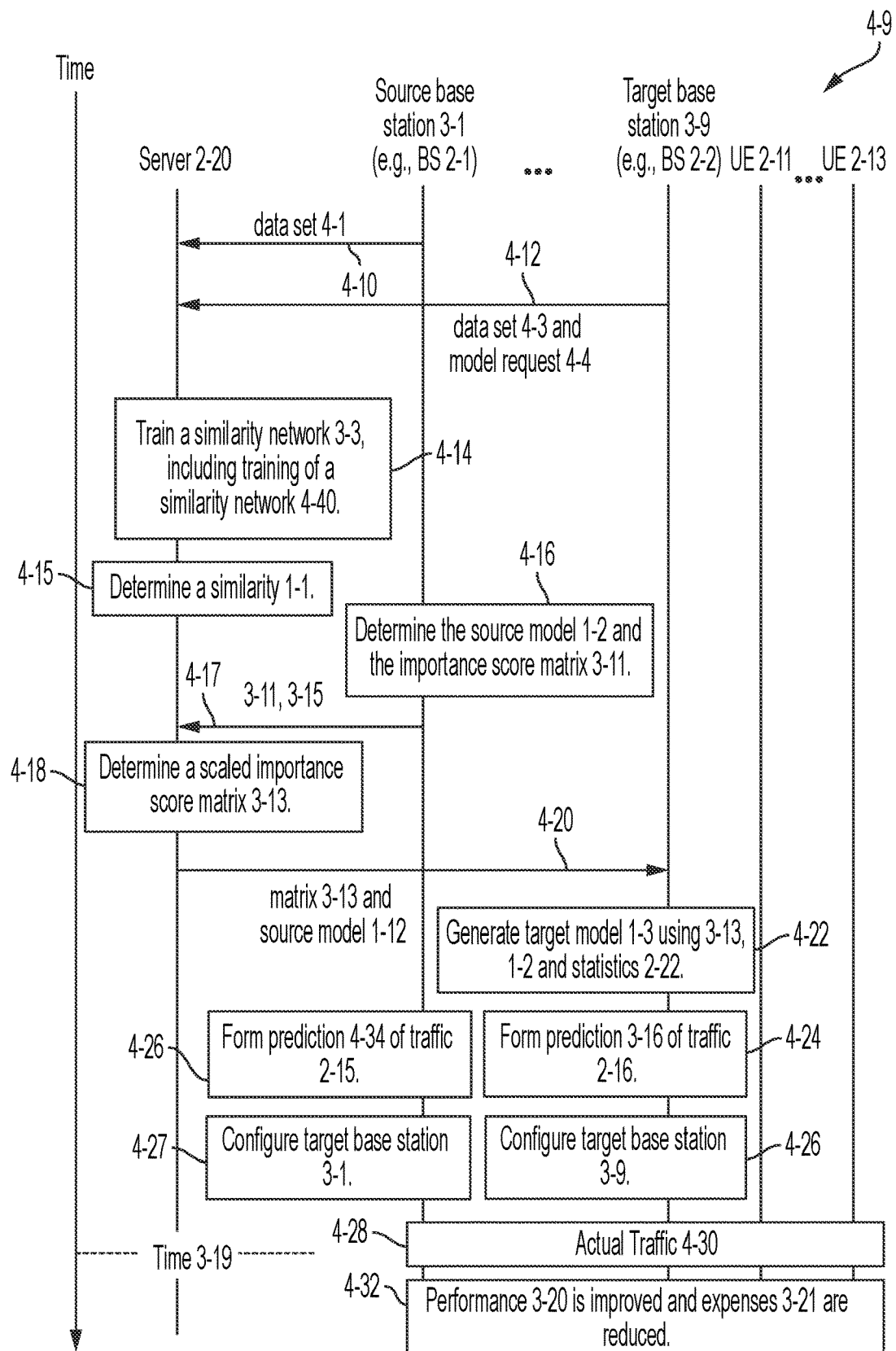
FIG. 4 illustrates an exemplary bounce diagram 4-9 showing communication and configuration among the entities of the system 2-50, according to some embodiments.

FIG. 4 illustrates an exemplary bounce diagram 4-9 corresponding to the logic of FIG. 3. A time axis advancing from top to bottom is shown on the left. At the top, system entities of the server 2-20, source base station 3-1, target base station 3-9, UE 2-11 and UE 2-13 are shown. Ellipses are shown to indicate there are in general many base stations and many UEs. There may be several source base stations, each one providing a source model to many target base stations. A base station is selected as source, in part, because the traffic at the source is similar to traffic at another base station which needs a model.

In FIG. 4, source base station 3-1 provides a data set 4-1 to the server 2-20 (message 4-10) and a target base station 3-9 provides a data set 4-3 and model request 4-4 (message 4-12, this may be several messages) to the server 2-20. The server 2-20 may determine which base station is a source base station and which is a target base station after receiving data set 4-1 and data set 4-3.

At operation 4-14, the server 2-20 trains the similarity network 3-3 including training of a similarity network 4-40. At 4-15, the server 2-20 determines a similarity 1-1 between the source base station 3-1 and the target base station 3-9.

At 4-16, the source base station 3-1 determines the source model 1-2 and the importance score matrix 3-11. This may be caused by a command from the server 2-20 (command not shown). In a message 4-17 (this may be several messages), the source base station 3-1 sends the importance score matrix 3-11 and the source model 3-15 to the server 2-20.

The server 2-20 then determines a scaled importance score matrix 3-13 at operation 4-18 and sends this along with the source model 1-2 to the target base station 3-9 in message 4-20.

The target base station 3-9 generates the target model 1-3 using the scaled importance score matrix 3-13, the source model 1-2 and statistics 2-22 (the statistics local to the target base station 3-9).

At operations 4-24 and 4-25 the target base station 3-9 and source base station 3-1 form respective predictions 3-16 and 4-34 of respective traffic 2-16 and 2-15. The target base station 3-9 then is configured based on prediction 3-16 at operation 4-16. The source base station 3-1 is configured based on prediction 4-34 at operation 4-27.

At a time 3-19, actual traffic 4-30 occurs (marked 4-28). Performance 3-20 is improved and expenses 3-21 are reduced (marked 4-32).

Figure 5:
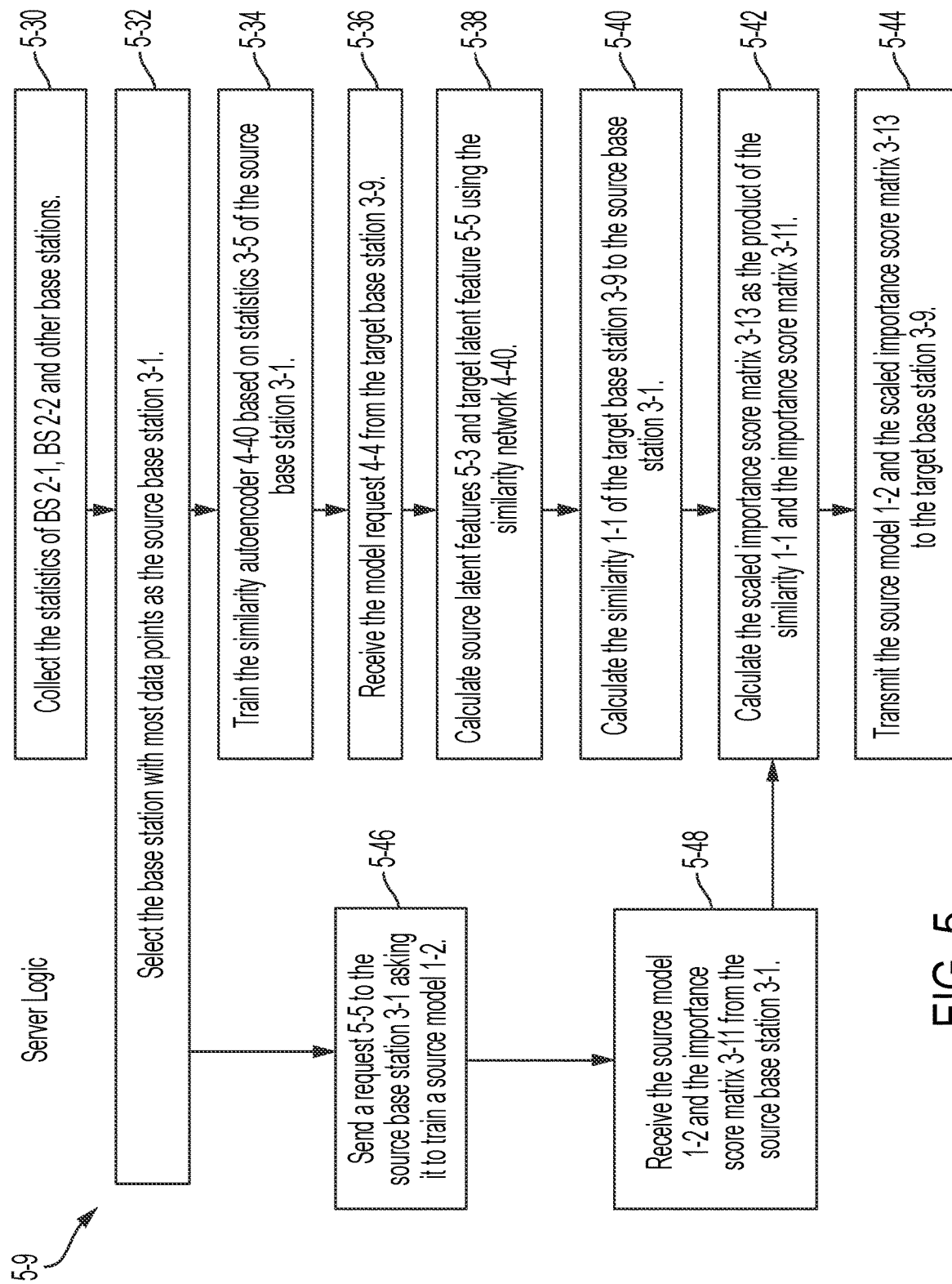
FIG. 5 illustrates exemplary logic 5-9 of the server 2-20, according to some embodiments.

FIG. 5 illustrates exemplary server logic 5-9 performed by server 2-20.

The server 2-20 determines which base stations are sources, which are targets, and a source base station for each target base station.

At operation 5-30, the server 2-20 collects the statistics of BS 2-1, BS 2-2 and other base stations.

At operation 5-32, the server selects a base station as a source base station 3-1 based in part on the base station having a high number of data points stored. The number of data points may correspond to, for example, several (3-12) months of log files of traffic history. A small number of data points would correspond to, for example a few weeks (2-6 weeks) of log files of traffic history.

Two logic flows occur after operation 5-32, one starting with operation 5-34 and one starting with operation 5-46. These may be done in parallel or serial fashion.

At operation 5-34, the server 2-20 trains a similarity network 4-40 based on statistics 3-5 of the source base station 3-1. At operation 5-36, the server 2-20 receives a model request 4-4 from the target base station 3-9. The server 2-20 calculates source latent features 5-3 and target latent features 5-5 using the similarity network 4-4 at operation 5-38.

At operation 5-40, the server 2-20 calculates the similarity 1-1 of the target base station 3-9 to the source base station 3-1.

Turning to operation 5-46, the server 2-20 sends a request 5-5 to the source base station 3-1 asking it to train the source model 1-2. At operation 5-48, the server 2-20 receives the source model 1-2 and the importance score matrix 3-11 from the source base station 3-1.

The parallel logic flows come together at operation 5-42 and the server 2-20 calculates the scaled importance matrix 3-13 as a product of the similarity 1-1 (a scalar) and the importance score matrix 3-11 (for example, Kronecker product). The server 2-20 at operation 5-44 then transmits the source model 1-2 and the scaled importance score matrix 3-13 to the target base station 3-9.

Figure 6:
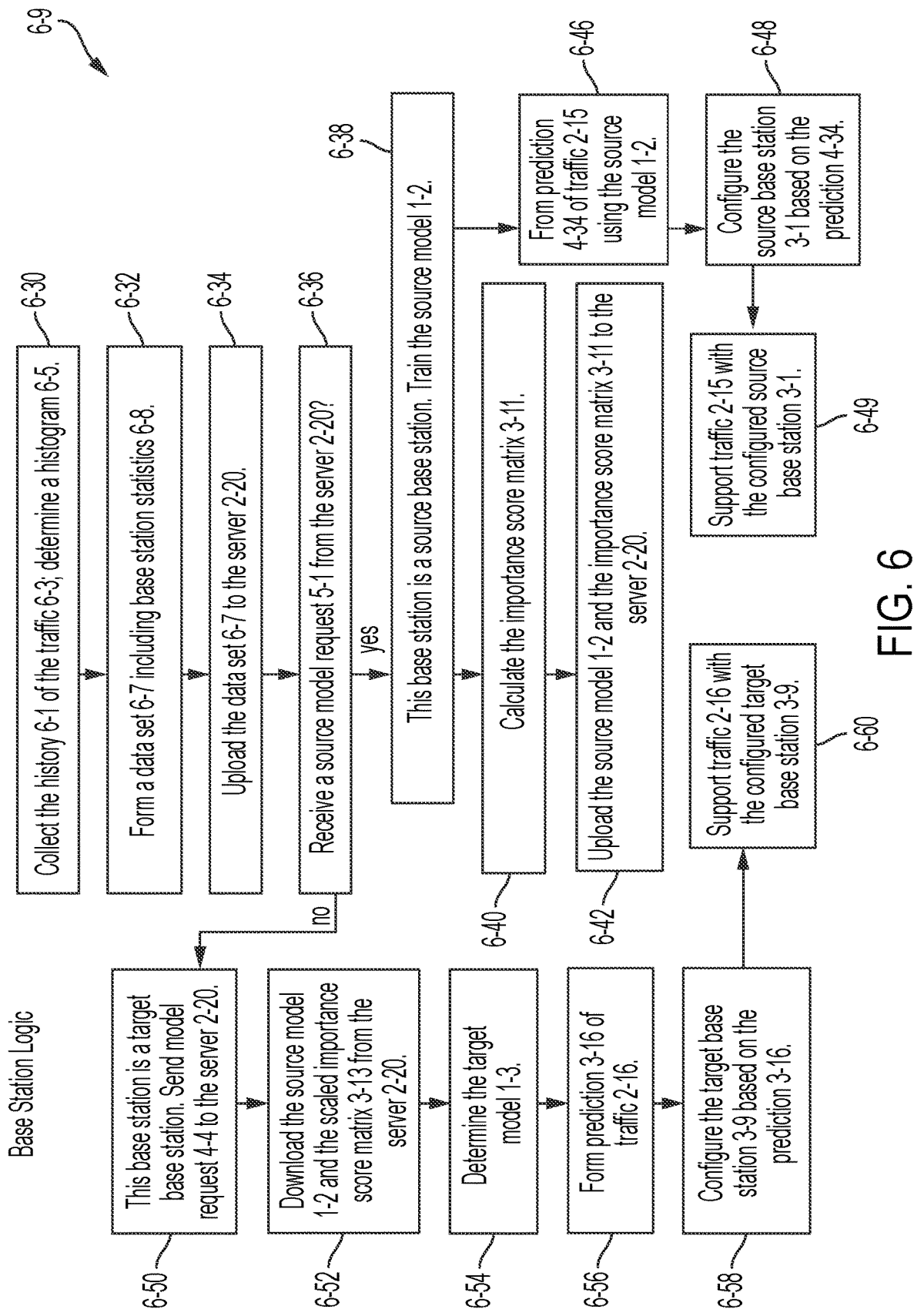
FIG. 6 illustrates exemplary logic 6-9 performed by a base station of the system 2-50, according to some embodiments.

FIG. 6 illustrates exemplary base station logic 6-9. At the beginning of the logic flow, the base station does not know if it is a source base station or a target base station. This determination is made by the server 2-20.

At operation 6-30, the base station collects history 6-1 of traffic 6-3 and determines a histogram 6-5. At operation 6-32, the base station forms a data set 6-7 including base station statistics 6-8. The base station then uploads the data set 6-7 to the server 2-20 at operation 6-34.

At operation 6-36, the base station determines whether a model request 5-1 has been received from the server 2-20. This determination may be made on a periodic basis or via some other predetermined schedule. If yes, the base station is a target base station and performs the logic of operation 6-38 next, which is to train the source model 1-2. If no, the base station is a source base station and performs the logic of operation 6-50 next.

Please refer to operation 6-50. The base station is a target base station, for example, target base station 3-9. The target base station 3-9 sends a model request 4-4 to the server 2-20. At operation 6-52, the target base station 3-9 downloads the source model 1-2 and the scaled importance score matrix 3-13 from the server 2-20. At operation 6-54, the target base station 3-9 determines the target model 1-3. At operation 6-56, the target base station 3-9 forms the prediction 3-16 of traffic 2-16. At 6-58, the target base station 3-9 is configured based on the prediction 3-16. Spectrum allocation of BSs are configured when deployed. The spectrum allocation is fixed at that time. If later, the spectrum allocation is changed by some dynamic algorithms, embodiments trigger the similarity calculation and similar operations as described herein. At operation 6-60, the target base station 3-9 supports traffic 2-16.

Please refer to operation 6-36. If a source model request 5-1 is received, the logic flows to operation 6-38 and the base station is a source base station, for example, source base station 3-1. The source base station 3-1 performs two actions, these can be in parallel. At operation 6-40, the source base station 3-1 calculates the importance score matrix 3-11. At operation 6-42, the source base station 3-1 uploads the source model 1-2 and the importance score matrix 3-11 to the server 2-20. The server 2-20 may then provide the source model 1-2 to another base station, see operation 6-52.

Again, referring to operation 6-38, the source base station 3-1 also acts to support traffic local to the source base station 3-1. At operation 6-46, the source base station 3-1 forms prediction 4-34 of traffic 2-15 using the source model 1-2. At operation 6-48, the source base station 3-1 is configured based on the prediction 4-34. At 6-49, the source base station 3-1 supports traffic 2-15.

Figure 7A:
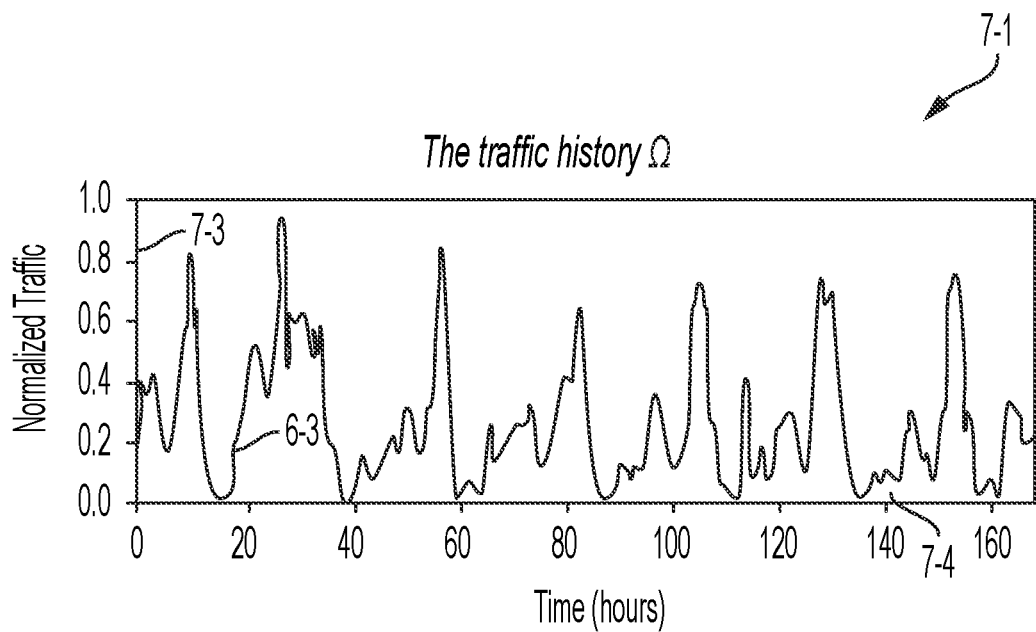
FIGS. 7A and 7B illustrate traffic history and a distribution (probability density or histogram) of traffic history.

FIG. 7A illustrates a graph 7-1 including traffic history $\Omega$ 6-3 in terms of a time series. The x-axis 7-4 is time and the y-axis 7-3 shows an intensity of traffic, normalized by a maximum value.

Figure 7B:
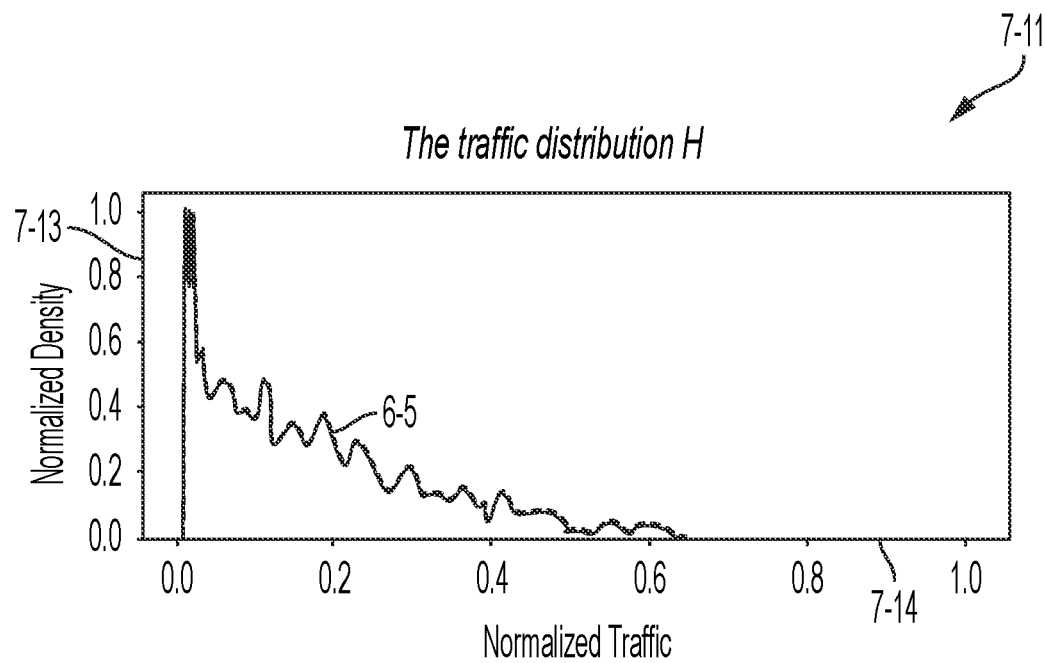

FIG. 7B illustrates a graph 7-11 including a normalized density or histogram 6-5 of $\Omega$ 6-3. The x-axis 7-14 is the random variable normalized traffic and the y-axis 7-13 is a probability of that given random variable value.

Figure 8A:
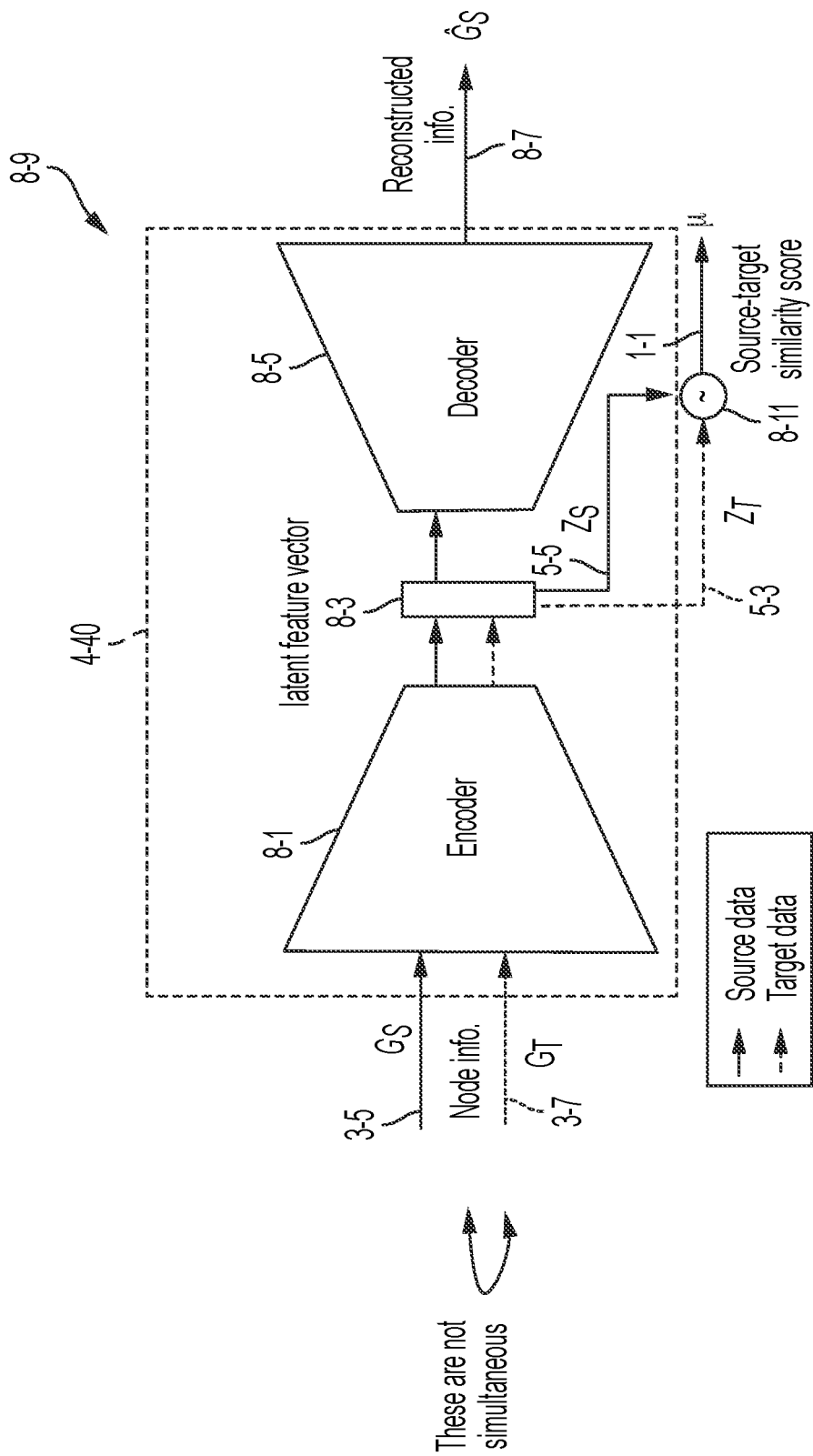
FIG. 8A illustrates an exemplary similarity network 4-40, according to some embodiments.

FIG. 8A illustrates a system 8-9 including similarity network 4-40 and a similarity calculator 8-11. The similarity network 4-40 includes the encoder 8-1 and decoder 8-5. First base station statistics 3-5 (source) $G_S$ are input to the encoder 8-1 and the latent vector $Z_S$ 5-5 is obtained. Second base station statistics 3-7 (target) $G_T$ are input to the encoder 8-1 and the latent vector $Z_T$ 5-3 is obtained. The similarity calculator 8-11 computes, for example, the cosine similarity, and provides the similarity 1-1 (here denoted $\mu$). From the latent vector $Z_S$ 5-5, the decoder has been trained to reconstruct base station statistics, in the example illustrated providing estimated first base station statistics 8-7, $\hat{G}_S$. $\hat{G}_S$ is part of the training process for similarity network 4-40, and is not directly used in determining similarity 1-1.

Figure 8B:
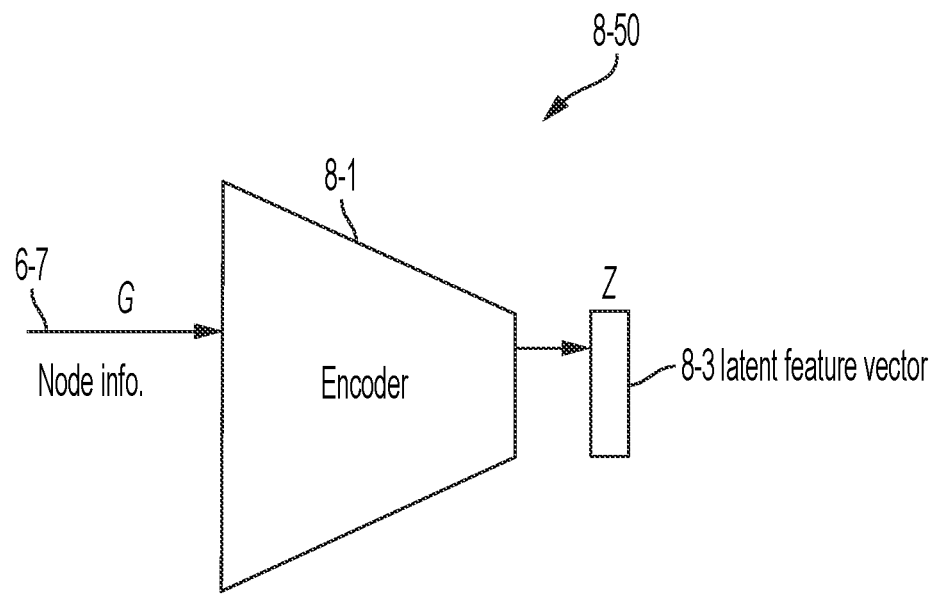
FIGS. 8B and 8C illustrate the autoencoder 8-1 and the latent feature vector 8-3, according to some embodiments.
Figure 8C:
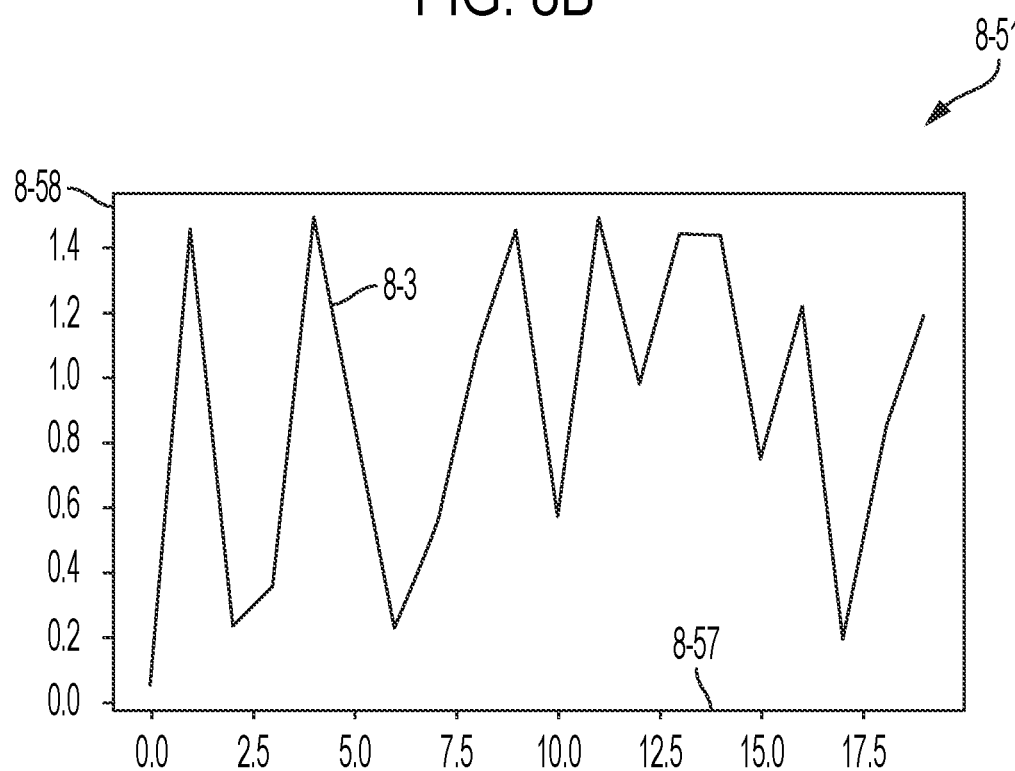

FIG. 8B illustrates the general operation 8-50 of the encoder 8-1, accepting an input 6-9, "G," and producing a latent feature vector 8-3, "Z." A schematic representation of the Z is shown in graph 8-51 with x-axis 8-57 and y-axis 8-58.

Figure 9:
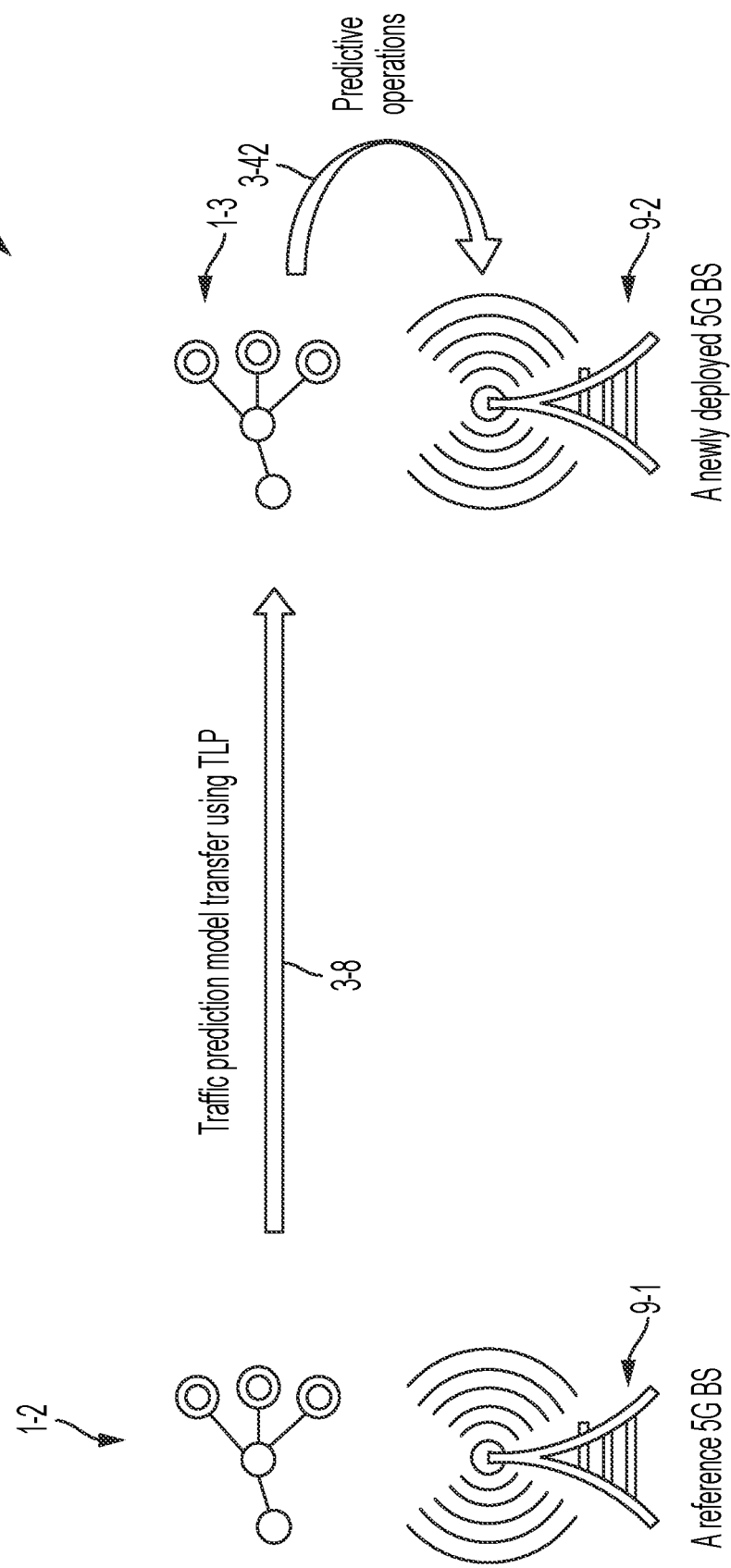
FIG. 9 illustrates application of the solution of embodiments to a newly deployed base station, according to some embodiments.

FIG. 9 illustrates model transfer 9-9 from a reference cellular communications BS 9-1 to a newly deployed cellular communications BS 9-2 (these may be, as a non-limiting example, 5G base stations as mentioned in FIG. 9). A source model 1-2 is transferred using logic 3-8 to obtain the target model 1-3. Operation 3-42 then occurs to predict traffic and then 3-44 is used to configure the target base station 9-2.

Figure 10:
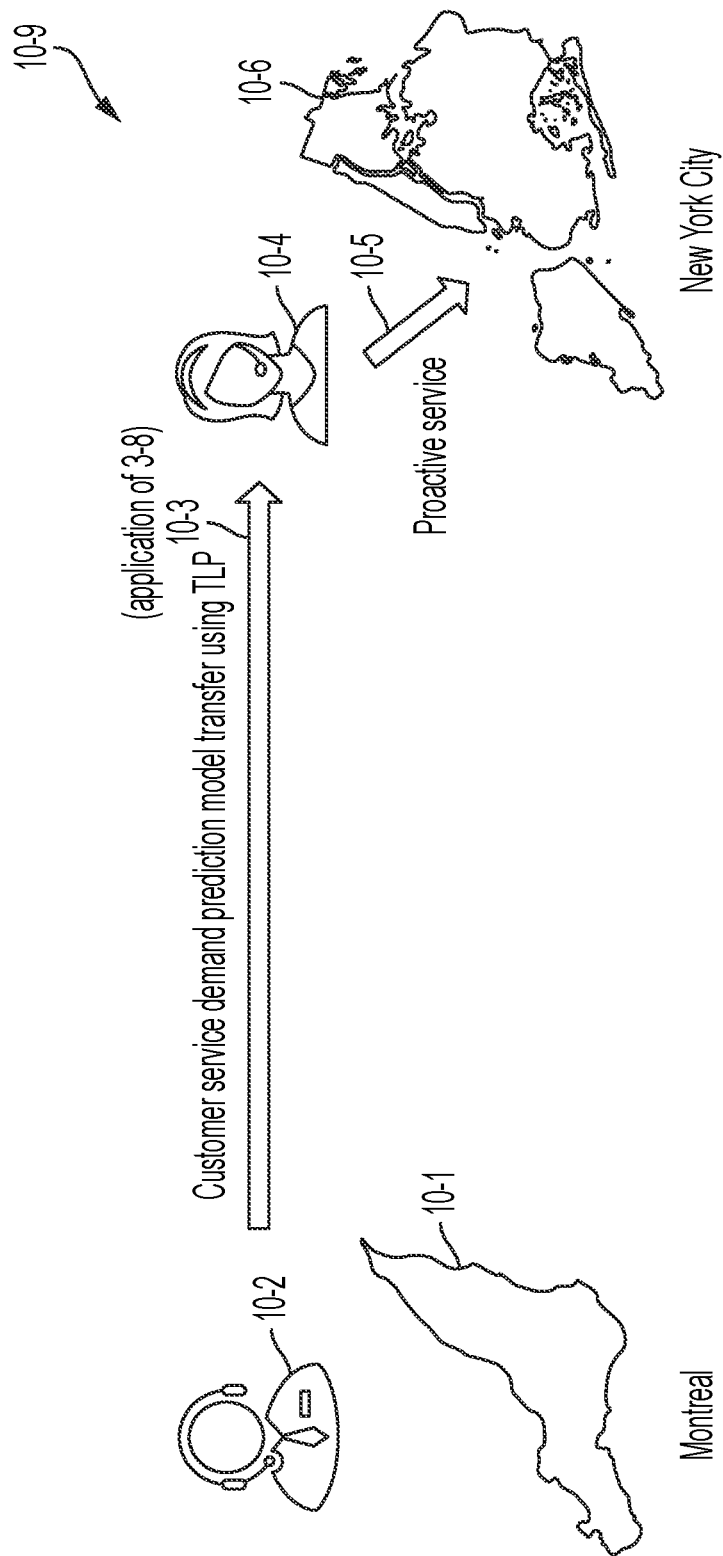
FIG. 10 illustrates application of the solution of embodiments to a traffic demand scenario related to customer service, according to some embodiments.

FIG. 10 illustrates an application 10-9 of the logic 3-8 to customer service demand prediction. A source model has been built at a first city 10-1 (e.g., Montreal, Quebec, Canada) in which persons 10-2 have been providing customer service (e.g., via phone or internet communications such as email or chat). A customer service operation is set up in a second city 10-6 (e.g., NY, N.Y., USA) in which persons 10-4 will provide service. Allocation of resources 10-5 based on a prediction are provided using logic 10-3 (which is 3-8 modified as needed).

Example approaches for performing the logic of FIGS. 3-6 is now provided.

Each base station records traffic data samples. The data set from the source base station is denoted $S_S$.

A traffic sample s[t] may be written as in Eq. (1). a[t] is the traffic amount.

$$s[t]=[a[t];t] \qquad \text{Eq. (1)}$$

A window c of traffic samples may be formed for time series analysis as in Eq. (2).

$$x[t]=[a[t],a[t+1],\ldots,a[t+c-1];t,t+1,\ldots,t+c-1] \quad \text{Eq. (2)}$$

and $$y[t]=a[t+c] \quad \text{Eq. (3)}$$

A transformed data sample is $u[t]=\{x[t]; y[t]\}$. The window is moved forward one sample to generate $u[t+1]$. A transformed data set is $\Omega_S=\{X_S,Y_S\}$, where $X_S=\{x[t]\}$ and $Y_S=\{y[t]\}$ denote all the input and output vectors transformed from $S_S$. The data set of the $k^{th}$ target base station is denoted $\Omega_T(k)$. The source model 1-2 is denoted $\theta_B$ below. The target model 1-3 for the $k^{th}$ base station is denoted $\theta_T(k)$ below.

The prediction loss for a new data sample x[t] at the target base station 3-9 can be defined as in Eq. (4).

$$L = \left(\frac{1}{|\Omega_T|}\right)\Sigma d(y[t],\hat{y}[t]) \quad \text{Eq. (4)}$$

where the summation ("$\Sigma$") is over $y[t] \in \Omega_T$. $|\Omega|$ is the size of the data set, $\hat{y}$ is the prediction of the ground truth y, and d(.,.) is an error metric (e.g., absolute error, square error, root square error).

Embodiments provide a target model 1-3 ($\theta_B$) for a small $\Omega_T$ from a big data set $\Omega_S$, while minimizing the loss L of Eq. (4) for the target base station 3-9.

One technique for model transfer is weight initiation. Weights are initiated from a source with values $w_{i,j}[0]$, and then updated using stochastic gradient descent (SGD).

$$w_{i,j}[t+1]=w_{i,j}[t]-\eta\nabla L \quad \text{Eq. (5)}$$

where t denotes the epoch number.

When the training is complete, the model $\theta_T$ has been learned.

Another technique for transfer is layer freezing as shown in the following two lines, which form Eq. (6).

$$w_{i,j}[t+1]=w_{i,j}[t] \text{ if } j \leq \beta$$

for other j, update using $w_{i,j}[t+1]=w_{i,j}[t]-\eta\nabla L$ Eq. (6)

Another technique for transfer is elastic weight consolidation uses the fisher information matrix (FIM). Let $F_{i,j}$ be the diagonal value of $w_{i,j}$'s FIM. $F_{i,j}$ can be computed using the first-order derivative as shown in Eq. (7).

$$F_{i,j} = E\left[\left(\frac{\partial L}{\partial w_{i,j}[0]}\right)^2\right] \quad \text{Eq. (7)}$$

Where the expectation ("E") is over those (x,y) in $\Omega_S$.

$F_{i,j}$ is now a constant score that measures the importance of $w_{i,j}$.

Given this importance score, the loss function to transfer and/or fine tune the neural network (NN) at the target is now updated as in Eq. (8).

$$L_{EWC}=L+\lambda L_R=L+\lambda\Sigma 0.5 F_{i,j}(w_{i,j}-w_{i,j}[0])^2 \quad \text{Eq. (8)}$$

where the sum is over i,j, $w_{i,j}$ at t=0 is the initial value of $w_{i,j}$ before transferring, the initial weight in the duplicated model (called here $\theta_D$) and $\lambda$ controls a balance between the prediction loss and the regularization term related to $F_{i,j}$.

The weights of the transferred model $\theta_T$ (target model 1-3) are updated as in Eq. (9).

$$w_{i,j}[t+1]=w_{i,j}[t]-\eta\nabla L_{EWC} \quad \text{Eq. (9)}$$

where, at a given epoch t, $\nabla L_{EWC} \triangleq \partial L_{EWC}/\partial w_{i,j}$.

Embodiments customize the importance scores to each individual target. Ideally, if a target is quite similar to the source, we prefer to keep the importance scores high to maintain the common features learned from the source. Otherwise, we lower the importance scores, so that the transfer model would not be overly constrained by the base model.

Embodiments provide a similarity-based EWC (SEWC) technique. SEWC describes the similarity between the source node and a target node on a high-level latent space with the help of an autoencoder (AE) (e.g., similarity network 4-40 of FIG. 8A). As shown in FIG. 8A (also discussed above), the input to the similarity AE is a vector G, which describes the characteristics of a node (either a target or the source).

In some embodiments, to describe a base station (also called a node herein), the following information is concatenated (also referred to as indications herein): 1) the traffic distribution, 2) the supported 3GPP frequency bands (including 3G, LTE/4G, and 5G bands), 3) the supported Radio Access Technology (RAT) types (including GSM, UMTS, FDD-LTE, TDD-LTE and 5G NR), 4) the class of 5G New Radio (NR) if applicable (i.e., wide area, medium range or local area node), and/or 5) the user density level around the node. The collection of the indications may be referred to as a data set herein, and as statistics. These statistics/indications are further described below.

The traffic distribution H: is represented by a 100-bin normalized histogram of a node's historical traffic as shown in Eq. (10).

$$H=\text{histo}(\Omega) \quad \text{Eq. (10)}$$

where histo is the calculation of normalized histogram.

Supported 3GPP frequency bands, $F_B$, are represented by a binary vector $F_B=f_b(1), f_b(2), \ldots, f_b(N_b)$ where $f_b(k)=1$ indicates that the $k^{th}$ frequency band is supported by the base station being described, and $N_B$ is the total number of bands defined in 3GPP standards. The frequency bands are concatenated in the order of 3G bands, LTE/4G bands, and 5G bands.

A supported Radio Access Technology (RAT) types $F_{RAT}$ is represented by a binary 5-dimensional vector $F_{RAT}=[f_{RAT}(1),\ldots,f_{RAT}(5)]$, where $f_{RAT}(k)=1$ indicates that the $k^{th}$ RAT type is supported by the base station being described. RAT types are organized in the order of GSM, UMTS, FDD-LTE, TDD-LTE and 5G NR). For example, $F_{RAT}=[0; 0; 1; 0; 1]$ means that FDD-LTE and 5G NR are supported by the current node.

A class of 5G NR F5G is denoted by a binary 5-dimensional vector $F_{5G}=[f_{5G}(1), \ldots, f_{5G}(4)]$, where $f_{5G}(k)=1$ indicates that the current node is a $k^{th}$ class 5G node. The classes are organized in the order of wide area, medium range and local area. For instance, $F_{5G}=[1; 0; 0]$ means that the current node is a wide area 5G NR node. For further description of classes, see TS 138104-V15.3.0-5G; NR; Base Station (BS) radio transmission and reception (3GPP TS 38.104 version 15.3.0 Release 15).

A user density level, $\rho$, around the BS being described. $\rho$ is a binary 3-dimensional vector $\rho=[\rho(1), \rho(2), \rho(3)]$. The density level are organized in the order of high, medium and low. For example, $\rho=[1; 0; 0]$ indicates that the user density around the current node is high. Some examples of user density thresholds are as follows: Th_low: 1,000 people per km², Th_high: 10,000 people per km². If Density>Th_high, density is high; else if, Density<Th_low, density is low; else, density is middle The indications or vectors described above are concatenated as in Eq. (11).

$$G=[H,F_B,F_{RAT},F_{5G},\rho] \quad \text{Eq. (11)}$$

This vector G, item 6-7 of FIG. 8B, is first mapped to a vector of latent features z (item 8-3 in FIG. 8A) by the encoder 8-1 of the similarity AE (also referred to herein as similarity network 4-40), as illustrated in FIG. 8A. z is then passed through the decoder 8-5 of the AE to generate a reproduction $\hat{G}$ 8-7, which aims to reproduce G 6-7 with high similarity (an exact copy would be the highest similarity). During the training process, the AE uses only the information of the source node $G_S$ 3-5 and learns to minimize a reconstruction loss $L_{RECON}$, defined in Eq. (12).

$$L_{RECON}=d(G_S,\hat{G}_S) \quad \text{Eq. (12)}$$

After this AE is trained, the encoder 8-1 is used to generate latent features (called Z 8-3) from both the source node description $G_S$ of the source base station 3-1 and the target node description $G_T$ of the target base station 3-9. The corresponding latent features are $z_S$ 5-5 and $z_T$ 5-3 (see FIG. 8A). The cosine similarity is calculated between $z_S$ and $z_T$ by the similarity calculator and the result, 1-1 (also called µ), is used as the source-target similarity score. The calculation is shown in Eq. (13).

$$\mu = \frac{(z_S \cdot z_T)}{\|z_S\| \times \|z_T\|} \quad \text{Eq. (13)}$$

This similarity score (µ, also referred to as similarity 1-1) is then multiplied by EWC's importance scores, thus generating node-similarity-aware importance scores as in Eq. (14).

$$FSIM_{i,j}=\mu F_{i,j} \quad \text{Eq. (14)}$$

The loss function to transfer the base model is given in Eq. (15).

$$L_{SEWC}=L+\lambda\Sigma 0.5\mu F_{i,j}(w_{i,j}-w_{i,j}[0])^2 \quad \text{Eq. (15)}$$

where the sum is over i,j.

The weights are updated at every epoch as in Eq. (16).

$$w_{i,j}[t+1]=w_{i,j}[t]-\eta \nabla L_{SEWC} \quad \text{Eq. (16)}$$

The techniques described above go from the entire model level (for WI), the separated layer level (for LF) to the individual weight level (for EWC and SEWC). WI treats all the weights in the model indifferently; LF differentiates the layers based on how general the extracted features are; EWC and SEWC places different importance scores on individual weights.

To integrate all of them into a single transfer learning based prediction (TLP) framework, embodiments provide a uniform formulation. Embodiments achieve this by reformulating the weight update rules of these techniques.

Let $\eta_{i,j}$ be the learning rate of the weight $w_{i,j}$ during the model transfer process. At each training epoch, the weight $w_{i,j}$ follows a uniform updating rule given by Eq. (17).

$$w_{i,j}[t+1]=w_{i,j}[t]-\eta \nabla L \quad \text{Eq. (17)}$$

If the WI technique is applied for the model transfer, then the learning rate remains the same for all the weights, as in Eq. (18).

$$\forall (i,j)\eta_{i,j}=\eta^* \quad \text{Eq. (18)}$$

where $\eta^*$ can be either a constant or a variable that changes according to the training epochs (but remains the same for all the weights within an epoch).

If the LF technique is chosen, then different learning rates are used for the front layers and the rear layers, as in Eq. (19) in the following two lines.

$$\forall i, \eta_{i,j}=0 \text{ if } j\le\beta$$

$$\forall i, \eta_{i,j}=\eta^* \text{ if } j>\beta \quad \text{Eq. (19)}$$

With respect to the learning rate for EWC, a first step is to take the partial derivative of Eq. (8) with respect to the weight $w_{i,j}$. Combining the result with Eq. (17), the learning rate for all i,j is given by Eq. (20).

$$\eta_{i,j} = \eta^* \cdot \left[1+\left(\frac{1}{\nabla L}\right)(\lambda F_{i,j}(w_{i,j}-w_{i,j}[0])]\right. \quad \text{Eq. (20)}$$

For SEWC, the learning rate is similar to Eq. (20) and is given in Eq. (21).

$$\eta_{i,j} = \eta^* \cdot \left[1+\left(\frac{1}{\nabla L}\right)(\lambda \mu F_{i,j}(w_{i,j}-w_{i,j}[0])]\right. \quad \text{Eq. (21)}$$

If the base model is applied directly at the target without any training, then for all i,j, the learning rate is zero as shown in Eq. (22).

$$\eta_{i,j}=0 \quad \text{Eq. (22)}$$

Considering Eq. (17), the nature of transfer learning can be explained.

As provided by embodiments, SEWC balances between preserving general features and learning new features, by adding a similarity-based regularization term to the updating process of every weight in the model. Increasing the regularization term helps preserve the general features more. Decreasing the regularization term gives the model more freedom to adapt to the new target data.

Substituting Eq. (21) into Eq. (17) provides Eq. (23).

$$w_{i,j}[t+1]=w_{i,j}[t]-\eta^*\gamma\mu F_{i,j}(w_{i,j}-w_{i,j}[0]) \quad \text{Eq. (23)}$$

In Eq. (23), the second term on the right side is the regular weight increment caused by prediction error gradients, and the third term is the extra weight increment brought by SEWC. Let this SEWC weight increment be $\delta_{i,j}$ as in Eq. (25).

$$\delta_{i,j}=-\eta^*\lambda\mu F_{i,j}(w_{i,j}-w_{i,j}[0]) \quad \text{Eq. (24)}$$

If $w_{i,j}=w_{i,j}[0]$ then $\delta_{i,j}=0$. In this case, the weight stays the same as its original value. Hence, SEWC does nothing.

If $w_{i,j}>w_{i,j}[0]$ then $\delta_{i,j}<0$. In this case, the weight is larger than its original value. SEWC poses a negative $\delta_{i,j}$ to drag the weight down. A higher similarity score µ, or a bigger importance score $F_{i,j}$, brings a larger decrease, and thus assigns $w_{i,j}$ a stronger pushback towards $w_{i,j}[0]$.

If $w_{i,j}<w_{i,j}[0]$ then $\delta_{i,j}>0$. In this case, the weight is smaller than its original value. SEWC poses a positive $\delta_{i,j}$ to bring the weight up to its original value faster, if the similarity score µ is high or the weight is important (big $F_{i,j}$).

From another perspective, $F_{i,j}$ also controls the sensitivity of $w_{i,j}$ towards the target data. If µ or Fi,j is large, it poses a high penalty, when $w_{i,j}$ is being updated by new data.

Example quantitative benefits are as follows.

Using the similarity 1-1 in the logic of FIG. 3 (also see Eq. (23)), permits very accurate prediction of load sooner than the next-best method, a neural network (NN) without the use of the similarity network 4-40 of FIG. 8A. The NN is, a prediction neural network using pattern recognition and machine learning. Also embodiments provide a better load prediction at a given time compared with the NN (20% better accuracy) and also compared with an auto-regressive integrated moving average (ARIMA) model for predicting time series (about 50% better accuracy).

Figure 11:
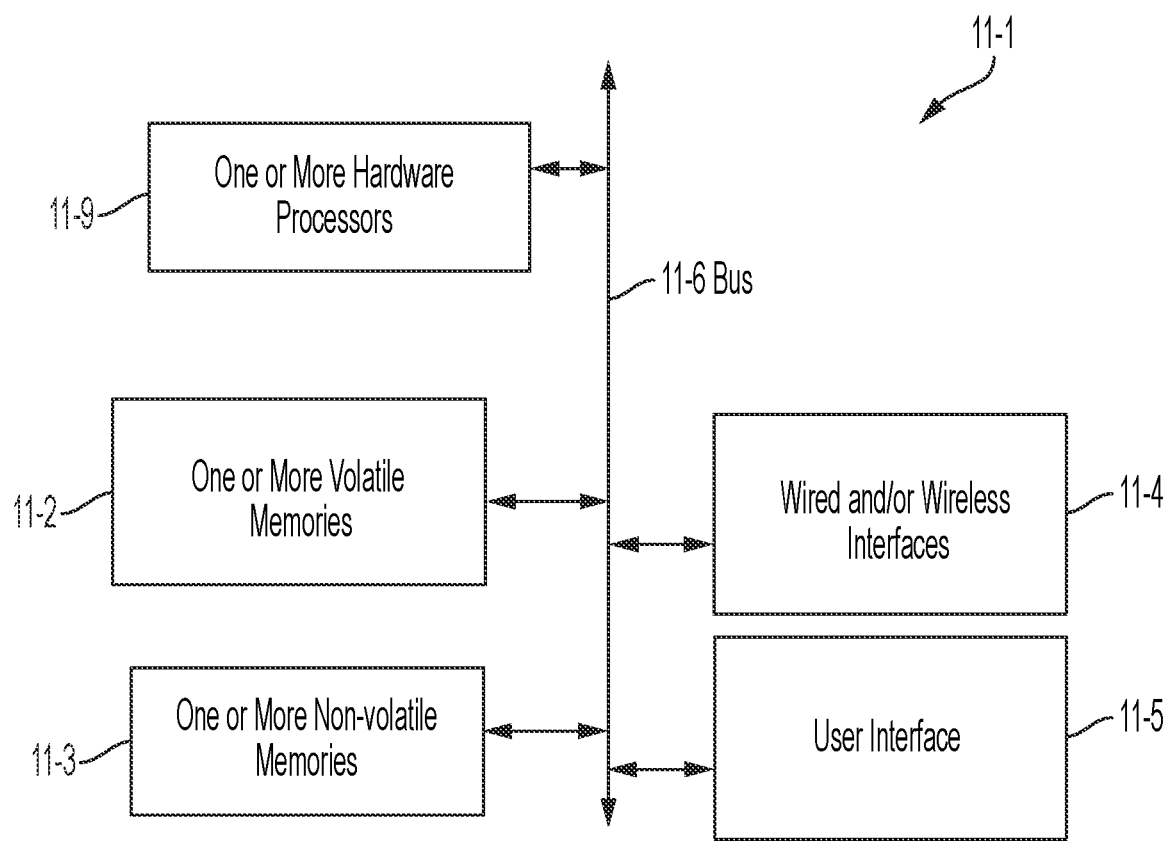
FIG. 11 illustrates exemplary hardware for implementation of computing devices such as the server 2-20 and the base stations of the system 2-50, according to some embodiments.

Hardware for performing embodiments provided herein is now described with respect to FIG. 11.

FIG. 11 illustrates an exemplary apparatus 11-1 for implementation of the embodiments disclosed herein. The apparatus 11-1 may be a server, a computer, a laptop computer, a handheld device, or a tablet computer device, for example. Apparatus 11-1 may include one or more hardware processors 11-9. The one or more hardware processors 11-9 may include an ASIC (application specific integrated circuit), CPU (for example CISC or RISC device), and/or custom hardware. Apparatus 11-1 also may include a user interface 11-5 (for example a display screen and/or keyboard and/or pointing device such as a mouse). Apparatus 11-1 may include one or more volatile memories 11-2 and one or more non-volatile memories 11-3. The one or more non-volatile memories 11-3 may include a non-transitory computer readable medium storing instructions for execution by the one or more hardware processors 11-9 to cause apparatus 11-1 to perform any of the methods of embodiments disclosed herein.

What is claimed is:

1. A server configured to manage traffic prediction model transfer learning among 5G base stations, the server comprising:
one or more processors; and
one or more memories, the one or more memories storing a program, wherein execution of the program by the one or more processors is configured to cause the server to at least:
receive a first plurality of base station statistics, wherein the first plurality of base station statistics includes a first data set of a first size from a first base station;
receive a second plurality of base station statistics, wherein the second plurality of base station statistics includes a second data set of a second size corresponding to a second base station;
select the first base station as a source base station;
train a similarity network;
receive a source prediction model from the first base station and an importance score matrix;
receive a prediction model request from a target base station, wherein the target base station is the second base station;
compute a first similarity using the similarity network;
obtain a first scaled importance score matrix based on the importance score matrix and based on the first similarity; and
send the source prediction model and the first scaled importance score matrix to the second base station, whereby the second base station is configured to use the source prediction model, and the first scaled importance score matrix to generate a target prediction model and predict radio system parameters relevant to the second base station, wherein the radio system parameters include a future value of user data traffic passing through the second base station.

2. The server of claim 1, wherein execution of the program by the one or more processors is further configured to cause the server to:
receive a third data set of a third size from a third base station;
determine a second similarity using the similarity network and the third data set;
compute a second scaled importance score matrix based on the second similarity and the importance score matrix; and
send the source prediction model and the second scaled importance score matrix to the third base station.

3. The server of claim 1, wherein the first data set includes a histogram of a traffic history of the source base station, wherein an abscissa of the histogram is proportional to bits per second, the first data set further includes a first indication of frequency bands supported by the source base station, a second indication of radio access types supported by the source base station, a third indication of 5G class types supported by the source base station and a fourth indication of user density currently supported by the source base station, and wherein a first node vector is formed based on the first data set.

4. The server of claim 3, wherein the importance score matrix is a second order derivative of a Fisher information matrix with respect to weights of the source prediction model, and the first scaled importance score matrix is a product of the importance score matrix and the first similarity.

5. The server of claim 1, wherein execution of the program by the one or more processors is further configured to cause the server to select a candidate base station with a largest data set as the source base station.

6. The server of claim 3, wherein the similarity network comprises an autoencoder, and execution of the program by the one or more processors is further configured to cause the server to train the similarity network by using gradient descent to update parameters of the autoencoder based on an autoencoder loss, wherein the autoencoder loss is a distance between the first node vector and an estimated node vector, wherein the estimated node vector is an output of the similarity network.

7. The server of claim 6, wherein execution of the program by the one or more processors is further configured to cause the server to compute the first similarity by:
obtaining a second node vector from the target base station;
obtaining a first latent vector as a first output of the autoencoder when the first node vector is input to the autoencoder;
obtaining a second latent vector as a second output of the autoencoder when the second node vector is input to the autoencoder; and
computing the first similarity as a cosine similarity between the first latent vector and the second latent vector.

8. A method for managing traffic prediction model transfer learning among 5G base stations, the method comprising:
receiving a first plurality of base station statistics, wherein the first plurality of base station statistics includes a first data set of a first size from a first base station;
receiving a second plurality of base station statistics, wherein the second plurality of base station statistics includes a second data set of a second size corresponding to a second base station;
selecting the first base station as a source base station;
training a similarity network;

receiving a source prediction model from the first base station and an importance score matrix;

receiving a prediction model request from a target base station, wherein the target base station is the second base station;

computing a first similarity using the similarity network;

obtaining a first scaled importance score matrix based on the importance score matrix and based on the first similarity; and sending the source prediction model and the first scaled importance score matrix to the second base station.

9. The method of claim 8, further comprising:

receiving a third data set of a third size from a third base station;

determining a second similarity using the similarity network and the third data set;

computing a second scaled importance score matrix based on the second similarity and the importance score matrix; and sending the source prediction model and the second scaled importance score matrix to the third base station.

10. The method of claim 8, wherein the first data set includes a histogram of a traffic history of the source base station, wherein an abscissa of the histogram is proportional to bits per second, the first data set further includes a first indication of frequency bands supported by the source base station, a second indication of radio access types supported by the source base station, a third indication of 5G class types supported by the source base station and a fourth indication of user density currently supported by the source base station, and wherein a first node vector is formed based on the first data set.

11. The method of claim 10, wherein the similarity network comprises an autoencoder, and the training the similarity network comprises using gradient descent to update parameters of the autoencoder based on an autoencoder loss, wherein the autoencoder loss is a distance between the first node vector and an estimated node vector, wherein the estimated node vector is an output of the similarity network.

12. The method of claim 11, wherein the computing the first similarity comprises:

obtaining a second node vector from the target base station;

obtaining a first latent vector as a first output of the autoencoder when the first node vector is input to the autoencoder;

obtaining a second latent vector as a second output of the autoencoder when the second node vector is input to the autoencoder; and computing the first similarity as a cosine similarity between the first latent vector and the second latent vector.

13. The method of claim 8, further comprising selecting a candidate base station with a largest data set as the source base station.

14. The method of claim 8, wherein the importance score matrix is a second order derivative of a Fisher information matrix with respect to weights of the source prediction model, and the first scaled importance score matrix is a product of the importance score matrix and the first similarity.

15. A non-transitory computer readable medium configured to store a program, wherein execution of the program by one or more processors of a server is configured to cause the server to at least:

receive a first plurality of base station statistics, wherein the first plurality of base station statistics includes a first data set of a first size from a first base station;

receive a second plurality of base station statistics, wherein the second plurality of base station statistics includes a second data set of a second size corresponding to a second base station;

select the first base station as a source base station;

train a similarity network;

receive a source prediction model from the first base station and an importance score matrix;

receive a prediction model request from a target base station, wherein the target base station is the second base station;

compute a first similarity using the similarity network;

obtain a first scaled importance score matrix based on the importance score matrix and based on the first similarity; and send the source prediction model and the first scaled importance score matrix to the second base station, whereby the second base station is configured to use the source prediction model, and the first scaled importance score matrix to generate a target prediction model and predict radio system parameters relevant to the second base station, wherein the radio system parameters include a future value of user data traffic passing through the second base station.

16. The non-transitory computer readable medium of claim 15, wherein execution of the program by the one or more processors is further configured to cause the server to:

receive a third data set of a third size from a third base station;

determine a second similarity using the similarity network and the third data set;

compute a second scaled importance score matrix based on the second similarity and the importance score matrix; and send the source prediction model and the second scaled importance score matrix to the third base station.

17. The non-transitory computer readable medium of claim 15, wherein the first data set includes a histogram of a traffic history of the source base station, wherein an abscissa of the histogram is proportional to bits per second, the first data set further includes a first indication of frequency bands supported by the source base station, a second indication of radio access types supported by the source base station, a third indication of 5G class types supported by the source base station and a fourth indication of user density currently supported by the source base station, and wherein a first node vector is formed based on the first data set.

18. The non-transitory computer readable medium of claim 17, wherein the similarity network comprises an autoencoder, and execution of the program by the one or more processors is further configured to cause the server to train the similarity network by using gradient descent to update parameters of the autoencoder based on an autoencoder loss, wherein the autoencoder loss is a distance between the first node vector and an estimated node vector, wherein the estimated node vector is an output of the similarity network.

19. The non-transitory computer readable medium of claim 18, wherein execution of the program by the one or more processors is further configured to cause the server to compute the first similarity by:

obtaining a second node vector from the target base station;

obtaining a first latent vector as a first output of the autoencoder when the first node vector is input to the autoencoder;

obtaining a second latent vector as a second output of the autoencoder when the second node vector is input to the autoencoder; and computing the first similarity as a cosine similarity between the first latent vector and the second latent vector.

20. The non-transitory computer readable medium of claim 15, wherein execution of the program by the one or more processors is further configured to cause the server to select a candidate base station with a largest data set as the source base station.

* * * * *